United States Patent
Kaempflein et al.

(10) Patent No.: US 9,007,665 B2
(45) Date of Patent: Apr. 14, 2015

(54) METHOD FOR DETECTING THE WIDTH AND POSITION OF DOCUMENTS USING IMAGE INFORMATION IN A LARGE-FORMAT SCANNER SYSTEM

(75) Inventors: Simon Kaempflein, Friedewald (DE); Burkhard Schoelpen, Slegen (DE)

(73) Assignee: Roth + Weber GmbH, Niederdreisbach (DE)

( * ) Notice: Subject to any disclaimer, the term of this patent is extended or adjusted under 35 U.S.C. 154(b) by 0 days.

(21) Appl. No.: 14/007,379

(22) PCT Filed: May 5, 2012

(86) PCT No.: PCT/EP2012/001940
§ 371 (c)(1),
(2), (4) Date: Nov. 8, 2013

(87) PCT Pub. No.: WO2012/156036
PCT Pub. Date: Nov. 22, 2012

(65) Prior Publication Data
US 2014/0063570 A1 Mar. 6, 2014

(30) Foreign Application Priority Data
May 16, 2011 (DE) .......................... 10 2011 101 725

(51) Int. Cl.
H04N 1/04 (2006.01)
H04N 1/40 (2006.01)
H04N 1/387 (2006.01)
H04N 1/38 (2006.01)
H04N 1/00 (2006.01)

(52) U.S. Cl.
CPC ....... *H04N 1/00734* (2013.01); *H04N 1/00702* (2013.01); *H04N 1/0071* (2013.01); *H04N 1/00745* (2013.01); *H04N 1/00748* (2013.01); *H04N 1/00753* (2013.01); *H04N 1/00758* (2013.01); *H04N 1/00769* (2013.01)

(58) Field of Classification Search
USPC ......... 358/450, 453, 483, 482, 496, 498, 448, 358/488, 463–466; 382/284, 312, 275, 382/270–272, 282, 291, 296
See application file for complete search history.

(56) References Cited

U.S. PATENT DOCUMENTS

| | | | | |
|---|---|---|---|---|
| 5,912,746 | A * | 6/1999 | Cilke et al. | 358/482 |
| 2004/0095613 | A1* | 5/2004 | Kuwabara | 358/450 |
| 2010/0195156 | A1* | 8/2010 | Horiuchi | 358/1.16 |
| 2013/0107330 | A1* | 5/2013 | Cullum et al. | 358/474 |
| 2013/0113990 | A1* | 5/2013 | Cullum et al. | 348/474 |
| 2013/0163021 | A1* | 6/2013 | Kinoshita | 358/1.13 |

* cited by examiner

*Primary Examiner* — Cheukfan Lee
(74) *Attorney, Agent, or Firm* — Andrew Wilford

(57) ABSTRACT

Documents in a large-format scanning system are scanned by coarsely recognizing longitudinal or transverse transition regions between a reflector roller and a document by the substeps of dividing the scanning image transversely into uniform image strips, determining statistical parameters for each image strip, examining the scanning image in the image strips with fixed threshold values for deviations such that, if a value of one the statistical parameters of an image strip exceeds the threshold value, this region is recognized as being a transverse transition region between the reflector roller and the document, and examining the image strips to determine the longitudinal transition region by line-by-line generation of an average value and determining sufficiently strong and steep edges, the image strips being rotated incrementally from the transverse of the document to an acute angle. Then longitudinal or transverse document edges within the transition regions detected by coarse recognition are finely recognized.

7 Claims, 3 Drawing Sheets

METHOD FOR DETECTING THE WIDTH AND POSITION OF DOCUMENTS USING IMAGE INFORMATION IN A LARGE-FORMAT SCANNER SYSTEM

CROSS REFERENCE TO RELATED APPLICATIONS

This application is the US-national stage of PCT application PCT/EP2012/001940 filed 5 May 2012 and claiming the priority of German patent application 102011101725 itself filed 16 May 2011.

FIELD OF THE INVENTION

The invention relates to a method of recognizing and detecting the width and position of documents in a large-format scanning system, such as for example a feed-through scanner, using recorded image information where the scanning system comprises image-detecting elements, for example CI sensors, to record the image information, optics disposed in front of them, and a reflector opposite the image-detecting elements.

BACKGROUND OF THE INVENTION

Methods are known where additional sensors installed in the document transport means, such as for example retroreflective sensors, are used to determine document width. The accuracy of recognition is limited here by the orientation and the number of sensors. This method is thus appropriate only for recognizing a limited number of formats, such as for example the various DIN formats.

In the case of a scanner with central guide without mechanical supporting aids to center the document, the position of a document must also be determined in addition to the width so as to allow the user to guide the document within certain tolerances. This makes use of the above-described method impractical even for a limited number of formats to be recognized since the accuracy of recognition is low even if the number of light sensors is high.

In addition, methods are well known that determine the document width by evaluating image information. To do this, the leading end of the document including the leading edge and the side edges of the document are tracked by the image-detecting elements of the scanner. This can be implemented by a prescan that precedes the actual scan, or can be achieved by capturing the entire document at the maximum scan width and then extracting the leading end from the image data. The advantage of these methods is that no additional sensors are required to detect document width.

In order to determine the width of a document from this image data, the approach must decide which pixels belong to the document and which ones belong to the background and/or the reflector. In image processing, problems of this sort are called segmentation.

A known method of segmentation and a method that can be employed for width recognition is the "threshold value method" that uses brightness-based detection. Here the pixels are assigned to the document or reflector based on their brightness or color. The pixel lying the furthest left or right and classified as a document pixel is interpreted as the transition between reflector and document, thereby enabling the width and the position of a document to be determined. This method exploits the fact that the color or brightness of the reflector, that is the reflector roller, which are of course known, generally do not match the color or brightness of the document.

A number of interfering factors occur in practice, however, that result in a very low hit rate for the method when used for width detection in a large-format scanner:
  contamination on the reflector (reflector roller(s));
  contamination of the optics for example the glass plate; and
  changes in the brightness value of the reflector as the air gap between glass plate and reflector roller changes, which changes occur, in particular, for thicker documents.

A further disadvantage of the method is that the color and/or brightness of the reflector must be different than that of the document. Aside from width detection, however, a white reflector has proven to be advantageous since this appears white in the scanned image for example when there are holes, etc., in the document, and thus matches the document background (paper white) that occurs most often. A white reflector is also optimal in the case of transparent originals. The problem that occurs, however, in connection with width recognition by the threshold value method is that reflector color and/or brightness, and/or document color and/or brightness, cannot be distinguished, or can be only barely distinguished, in particular, at the margin. As a result, the method cannot be used under these conditions.

Other well-known approaches are called edge-oriented methods for segmentation. These methods search for edges in the image that generally represent object transitions. In the case of the application as described, these object transitions occur between document and reflector, and are then recognized by the method as an edge. These edges also appear whenever the reflector and the document are of the same brightness or color, due to the fact that the arrangement of the light source in scanners using CI sensors (contact image sensors) produces a shadow at the transitions between reflector and document. This is one major advantage this method has over the above-referenced threshold value methods. In order to determine the document width, the method must determine the transverse edges of the paper on the left and right sides of the original.

In practice, however, these methods too result very frequently in faulty detection since the edges at the transition between reflector and document are often weaker than so-called "spurious edges" that are created by interference factors.

These interference factors are created by
  contamination of the reflector (reflector roller(s), and
  contamination of the optics (for example, glass plate).

In particular, contamination of the reflector cannot be avoided in practice, and in the case of a scanner using non-driven, cascaded reflector rollers produces transverse "spurious edges," since individual rollers are not made to rotate during the scan. These "spurious edges" are transverse bands on the reflector roller and/or glass plate that are the result of rubbing when the scanning original moves over them.

Modern CI sensors using several light sources furthermore only produce a very weak shadow at the transverse transitions between reflector and document, and the result is therefore only a very weak transverse edge.

Also well-known are model-based methods. Here a search is effected within the image based on a model of the objects. Width recognition here involves a model that searches for corners. This method is more robust in response to interference factors than the above-described, edge-oriented method. This disadvantage of the method, however, is that documents are not recognized correctly which do not conform to the corner model due to dog-eared sections or tears. In addition, faulty recognition often occurs with this method in combination with modern CI sensors using multiple light sources that only casts a very faint shadow at the transverse edges of the document.

Object of the Invention

The object of the invention is to enable reliable recognition to be effected with a scanning method of the type described above, including when there is minimal creation of shadows at the transitions between documents and reflector, when the differences in brightness between document and reflector are low, and when there are interference factors caused by contaminated reflectors or the optics, or there are dog-eared sections and/or torn corners.

SUMMARY OF THE INVENTION

This object is achieved according to the invention for a method comprising the following steps:

S1) preprocessing the recorded image information in order to reduce interference factors due to contamination of the optics and reflector;

S2) coarse recognition of longitudinal and/or transverse transition regions between reflector and document; and S3) fine recognition of longitudinal and/or transverse document edges within the transition regions detected in step S2 by coarse recognition.

This step-by-step detection of edges ensures reliable recognition even when there is minimal creation of shadows at the transitions between document and reflector, when the differences in brightness between document and reflector are low, and when there are interference factors caused by contaminated reflectors or optics.

The preprocessing in step S1 can advantageously include the following substeps:

S1$a$) generating average values for the pixels of each image column in the leading end of the longitudinal transition region before the document moves onto the reflector in order to generate an average-value line and determine an average value for the entire leading end of the longitudinal transition region before the document moves onto the reflector;

S1$b$) determining a weighting factor for each image column from the magnitude of the deviations of average values of the pixels for the respective beginning of the image column from the average values of the pixels for the respective end of the image column and the standard deviation of the respective image column;

S1$c$) calculating a new image utilizing the weighting factor and the average value for the longitudinal transition region.

It has been found advantageous if the coarse recognition of the transition region in step S2 comprises the following substeps:

S2$a$) dividing the scanning image transversely into uniform image strips (1 through n pixels);

S2$b$) determining statistical parameters for each image strip;

S2$c$) examining the scanning image in the image strips with fixed threshold values for deviations in such a way that if a value of one of the statistical parameters of an image strip exceeds the threshold value this region is recognized as being a transverse transition region between reflector and document;

S2$d$) examining the image strips to determine the longitudinal transition region by line-by-line generation of an average value, and determining sufficiently strong and steep edges.

According to the invention, the statistical parameters for each image strip in substeps S2$b$ and S2$c$ can be the average value and/or the standard deviation.

Documents that have dog-eared sections and/or torn corners can also be reliably recognized if the image strips are rotated incrementally according to the invention from the transverse up to an angle of 90°, preferably, 45°.

The fine recognition of document edges in step S3 can advantageously comprise the following substeps:

S3$a$) detecting longitudinal and/or transverse document edges within a transition region using the method of detecting edges; and S3$b$) determining the first edge by a threshold comparison.

According to the invention, fine recognition of document edges in step S3 can also include the following substep:

S3$c$) using the strongest edge whenever no edge is found by the threshold comparison of substep S3$b$.

It has been found advantageous if the optics in front of the image-detecting elements for recording the image information are for example a glass plate, and/or if the reflector disposed opposite the image-detecting elements is a pressure roller and reflector roller.

BRIEF DESCRIPTION OF THE DRAWING

The following discussion describes the invention in more detail based on illustrated embodiments that are shown in the drawing. Therein.

SPECIFIC DESCRIPTION OF THE INVENTION

Figure 1:
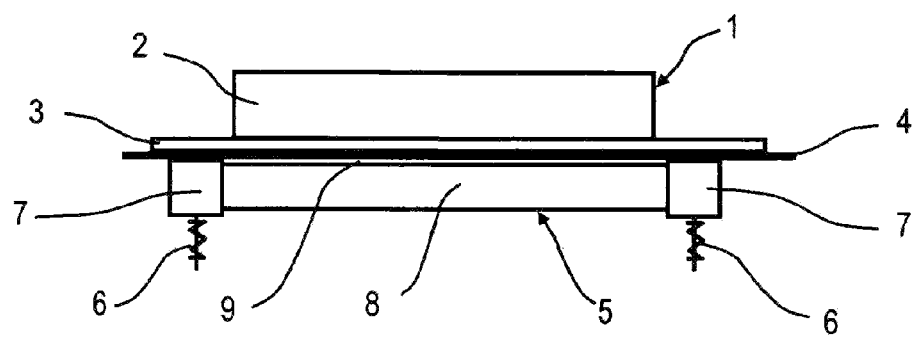
FIG. 1 shows a system including image-detecting elements and reflector roller.

FIG. 1 shows a scanning system 1 comprising an a glass plate 3 in front of an image-detecting element 2. A reflector roller 5 uses springs 6 to press a document 4 against this glass plate 3. The force of the springs 6 here engages ends 7 of 1$t$ reflector roller 5, thereby pressing the reflector roller 5 onto the document 4. The ends 7 of the reflector roller 5 can be provided with laterals stops, as shown here, that are of a larger diameter than a center region 8 of reflector roller 5. This creates in the center region 8 between the reflector roller 5 and the glass plate 3 a gap 9 of defined size that ensures optimal contact of the document 4 with the glass plate 3. In addition, the gap 9 provides sufficient space for the document 4 at the center region 8 of the reflector roller 5. It is obviously also possible to employ reflector rollers of other designs.

Figure 2:
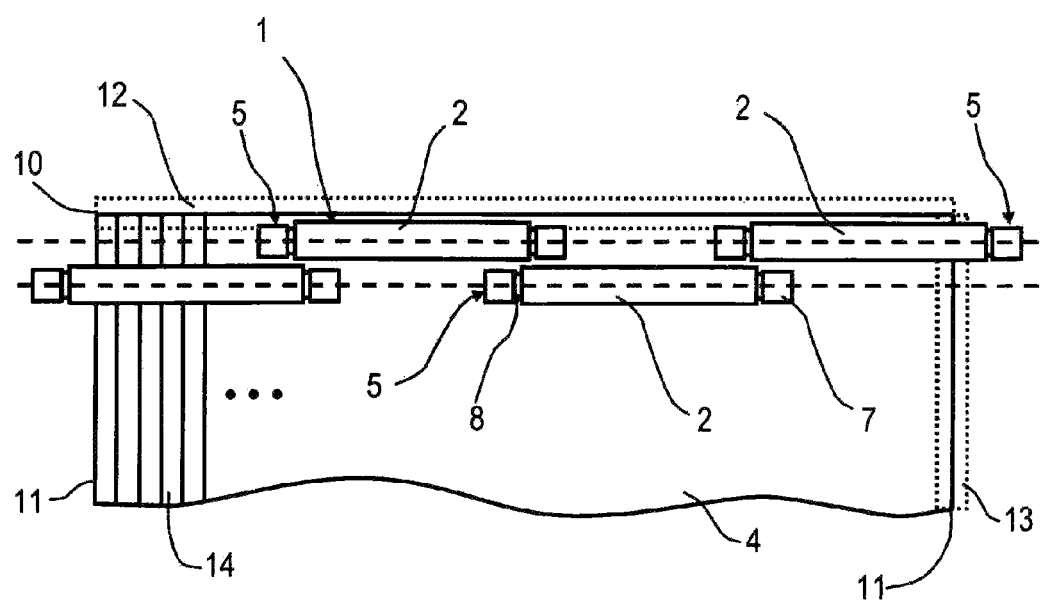
FIG. 2 shows a scanning system having cascaded image-detecting elements.
Figure 3:
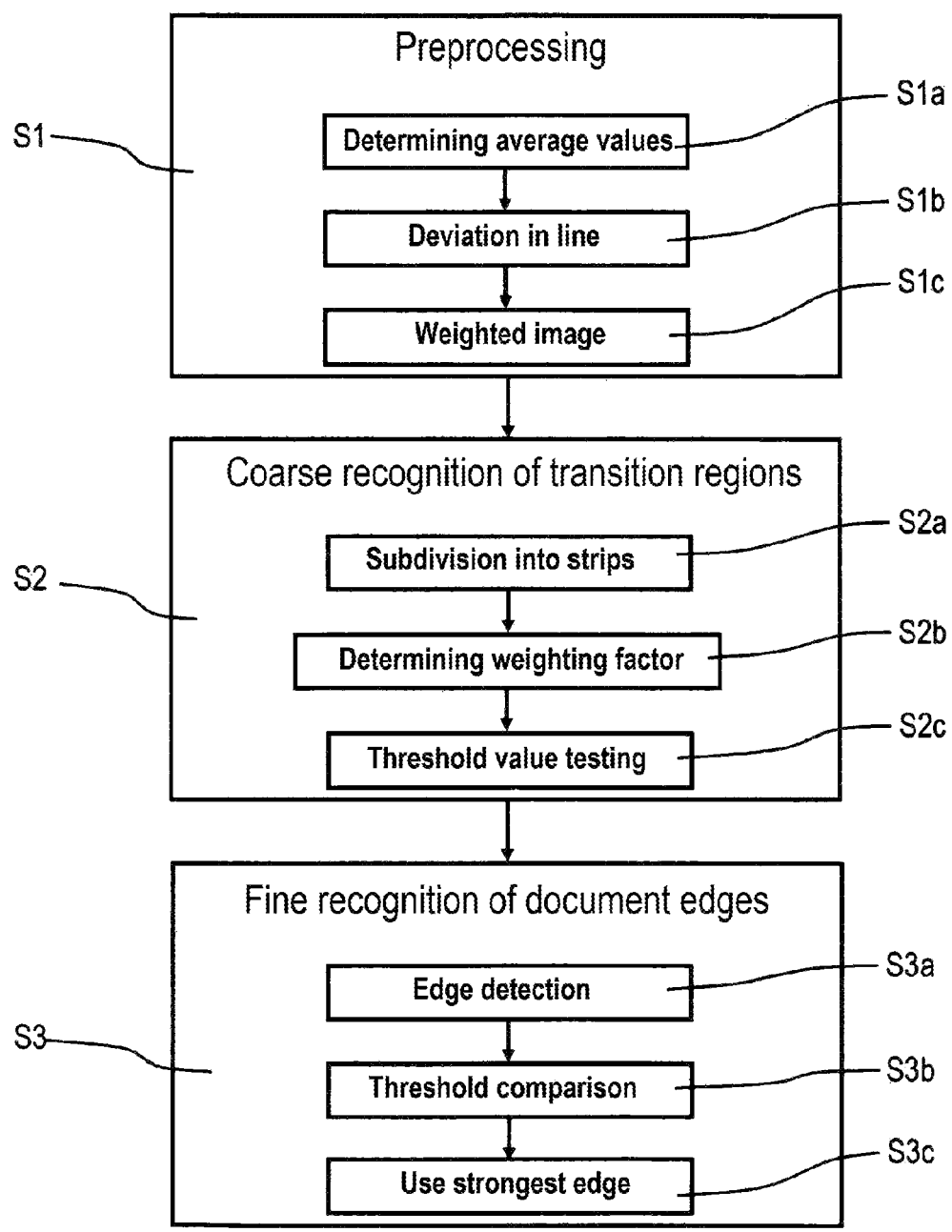
FIG. 3 shows a process according to the invention for detecting the width of a document.

FIG. 2 is a top view of the scanning system 1 comprising four image-detecting elements 2 for scanning a large-format document, these elements being disposed in a cascaded and staggered array. However, one continuous image-detecting element can for example also be used. One reflector roller 5 is associated with each image-detecting element 2. Document 4 has one leading edge 10 and side edges 11. A longitudinal transition region 12 between reflector or reflector roller 5 and document 4 begins downstream of a leading edge 10 of document 4. Transverse transition regions 13 between reflector roller 5 and document 4 are located at side edges 11 of document 4.

The following discussion describes the procedural steps essential to the invention in more detail, which method comprises three main steps.

A first main step S1 involves preprocessing of the image information recorded and captured by image-detecting elements 2 in order to reduce interfering factors caused by contamination of the optics, for example of the glass plate 3 and the reflector, for example the reflector roller 5. A second main step S2 effects a coarse recognition of longitudinal and/or transverse transition regions 12 and 13 between the document 4 and the reflector roller 5. A further main step S3 effects fine recognition of longitudinal and/or transverse document edges 10 and 11 inside the transition regions 12 and 13, detected in step S2, between the document 4 and the reflector roller 5 in order to accurately recognize a leading edge 10 and side edges 11 of the document 4 as being the transition between the reflector roller 5 and the document 4.

These three main steps can furthermore be subdivided according to the invention into the following subordinate or substeps:

A first substep S1a of the main step S1 involves preprocessing to determine average values of the pixels for each image column (S) in the leading end of the longitudinal transition region 12 before the document 4 moves onto the reflector roller 5 in order to generate an average-value line (ZM). In addition, an average value (M) is determined for the entire longitudinal transition region 12.

A second substep S1b determines a weighting factor for each image column as a function of the magnitude of deviation of the average values of the leading-end image region and the remaining image region of the image column, and of the standard deviation of the entire column.

In a further substep S1c, a new image is calculated by utilizing a weighting factor (W) and the average value (M) of the longitudinal transition region (12) of the entire leading end.

In a first substep 2a of the second main step S2—coarse recognition—a subdivision is effected of the scanning image transversely in uniform image strips 14.

Statistical parameters are determined for each image strip 14 in second substep S2b, wherein the average value and/or the standard deviation can be calculated.

In further substep S2C, an examination is effected of the scanning image in image strip 14 using fixed threshold values for deviations whereby whenever a value for one of the statistical parameters of image strip 14 exceeds the threshold value, this region is recognized as being transverse transition region 14 between reflector roller 5 and document 4.

In first substep S3a of main step S3, fine recognition, an edge detection method is used to recognize longitudinal and/ or the transverse document edges 10 and 11 within the transition regions 12 and 13.

In further substep S3b, a threshold-value comparison is used to determine a first edge, as will be described below.

If no edge is found in substep S3b by the threshold-value comparison, then the strongest document edges as determined in third substep S3c can be used.

Figure 4:
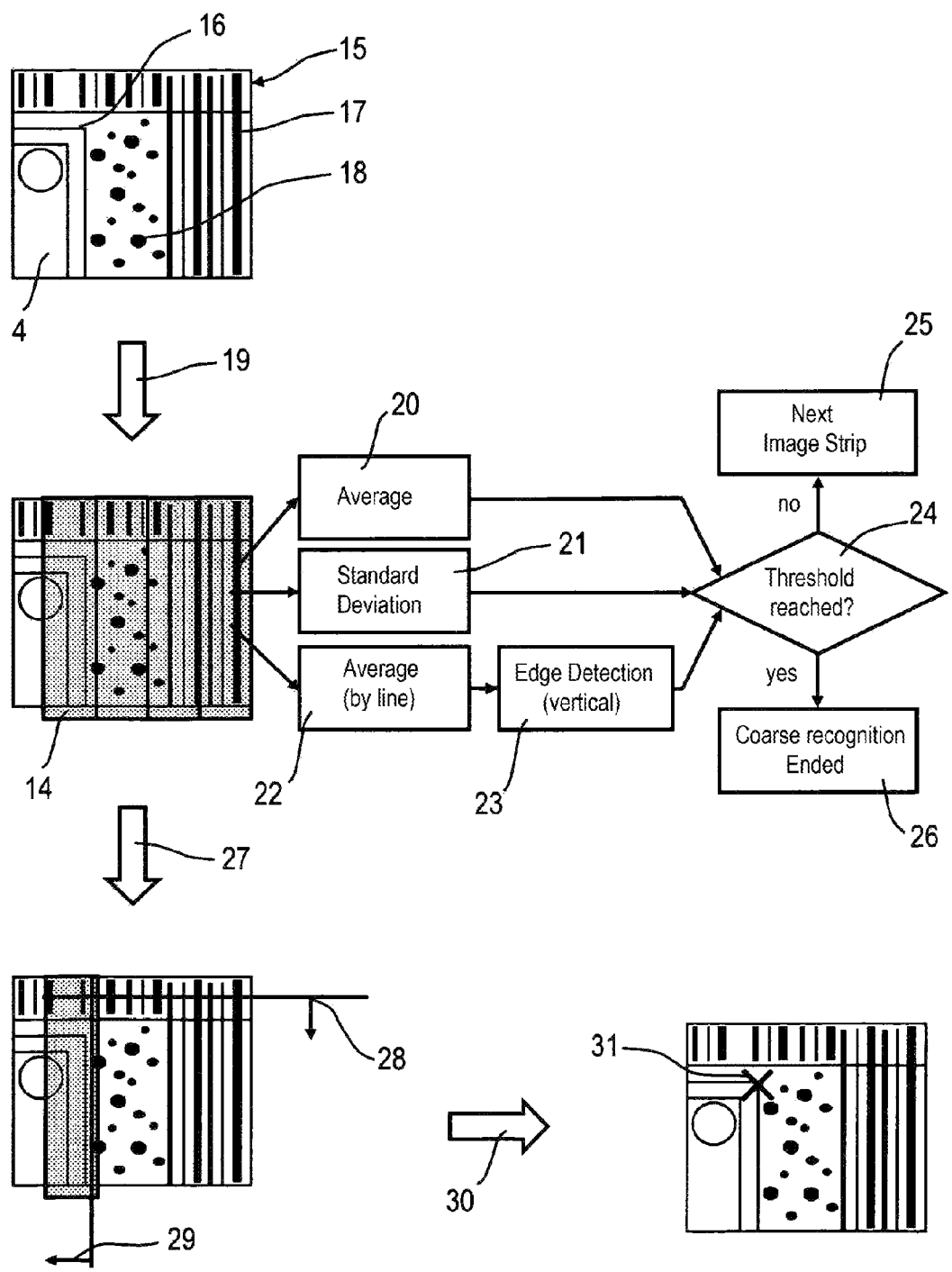
FIG. 4 is a flowchart of the process according to the invention for detecting the width of a document.

FIG. 4 is a flowchart of the process according to the invention for detecting the width of a document. In one scanned region 15, the document 4 can be detected at one corner where the document edges 10 and 11 cast a shadow 16. Banding-type interference factors 17 created by contamination of stationary reflector rollers 5 or of the optics/glass plate 5 are ascertained externally, while point-type interference factors 18 created by contamination of the reflector rollers 5 are ascertained within an inner region outside the document 4.

Following the above-described preprocessing 19, the coarse recognition simultaneously determines an average value 20, a standard deviation 21, and a line average value 22 within a transversely oriented image strip 14. Transverse edge detection 23 is implemented based on the line average value 22. Each of these three values 20, 21, and 23 is compared with a threshold value, and the query 24 "Threshold value reached?" is executed based on this comparison. If "no", the operation moves to the next image strip 14 with operation "Next Image Strip" 25, and the evaluations 20 through 23 are repeated. In response to yes, a branch operation 24 is followed by "coarse recognition complete."

The operation then switches to fine recognition 27, which is based on the image strip 14 that was detected in the coarse recognition by the fact that the threshold value has been reached in it, and fine recognition first detects longitudinal edges 28, such as for example the shadow 16 cast by the document edge 10, and then detects transverse edges 29, such as for example the shadow 16 cast by the document edge 11. The result 30 of this operation is marking 31 of the corner of the document. Repeating this procedure on the other corners of the document enables the width and the position of the document 4 to be calculated and provided based on this information.

Functioning as input data for detecting the document width and position in a large-format feed-through scanner are the image information data from the leading end of document 4, including the leading edge 10 and the side edges 11, which region has been recorded by the image-detecting elements 2 of the large-format scanning system 1.

The method can thus be subdivided into three substeps that are linked with each other by a higher-order algorithm, the sequential processing of the individual substeps:

preprocessing to reduce interference factors due to contamination of the reflector (reflector roller 5) and the optics (glass plate 3);

coarse recognition of transition regions 12 and 13 between the document 4 and the reflector roller 5 within the image strip 14; and fine recognition within an area isolated by the coarse recognition operation from the detected image strip 14 in order to accurately recognize the leading edge 10 of the document 4 and the reflector/document transition, the transverse document edges, and the side edges 11 of the document 4.

Preprocessing

The purpose of preprocessing is to reduce banding and/or interference factors that are caused by nonrotating reflector rollers 5 and/or the optics of the scanning system 1, in particular, the glass plate 3, thereby minimizing the probability of faulty recognition.

A distinguishing feature must be present in order to prevent this preprocessing from also weakening or removing transverse document edges, i.e., the side edges 11 of the document 4. In order to obtain this feature, a significant area downstream of the leading edge 10 of document 4, i.e., longitudinal transition region 12 between document 4 and reflector roller 5, is captured at the same time when generating the input image. The method then exploits the fact that no document is yet present in the leading-end image region within the longitudinal transition region 12 between the document 4 and the reflector roller 5.

For each image column (S), which is a column of one pixel width, the average value of the pixels in this column (S) is first generated in the leading end in which it is reliably true that there is no document. The result is an image line with average values in the leading-end scanning region, a so-called average-value line (ZM). In addition, the average value for the entire longitudinal transition region 12 between the document 4 and the reflector roller 5 is also determined.

Within the remainder of the image, the respective absolute deviation of the pixels of the line from the pixels of the average-value line (ZM) is now determined, and a new image is calculated therefrom utilizing a weighting factor, described below, and the average value for the entire leading end. Any interference factors 17 that uniformly occur in each image line are thus eliminated, such as those caused by contaminated, nonrotating reflector rollers 5 or contamination of the optics.

The weighting factor can be used to control whether the average value of the column or the overall average value for the leading-end image region is incorporated in the result so as to prevent any interference factors 18 not uniformly affecting each line from producing new interference banding. The actual weighting factor is determined for each column as a function of the magnitude of the deviation of average values of the leading-end image region and remaining image region of the column, and the standard deviation of the entire column.

This ensures that the method does not create any new interference in the regions in which the interference factor 18 does not uniformly affect all image lines. This applies, in particular, to interference due to contamination on the reflector rollers 5 whenever they are not rotating in the leading end but are subsequently made to rotate by the document 4, due to the fact that here contamination on the reflector roller 5 does not affect all image lines uniformly and thus cannot be eliminated by the method. These regions remain essentially unmodified. These generally point-type interference factors 18 are not critical since the method described below for detecting the transitions between the reflector roller 5 and the document 4 is based on an edge detection approach.

Coarse Recognition

The purpose of coarse recognition is to determine the transition region between the reflector and the document 4 quickly but with reduced accuracy in order, among other reasons, to reduce the search area for subsequent fine recognition.

To do this, the image is first subdivided transversely into the uniform image strips 14. Statistical parameters—the average value and the standard deviation—are determined for each image strip 14. The operation runs through the image strips 14 starting from the outer image edge and uses fixed threshold values to examine them for deviations. Whenever a value exceeds one of the statistical parameters—average value or standard deviation—of the image strip 14, this region is recognized as being a transition region 13 (transverse transition regions 13 between the document 4 and the reflector roller 5). In addition, the operation checks whether the values of following image strips 14 also exceed the threshold value, thereby enhancing the robustness of the method in response to interference factors.

This enables the transition region 13 to be reliably detected in documents 4 in which the color and/or brightness differ from that of the reflector roller 5, or that have significant information content in the border region.

In addition, a method based on recognition of the leading edge 10 is also employed so as to be able to also recognize documents 4 that exhibit a color and/or brightness similar to that of the reflector rollers 5 and lack significant information content in the edge regions. The reason here is that a sufficiently strong shadow 16 is visibly cast on the document leading edge 10 even when CI sensors with multiple light sources are used.

For each of the above-mentioned image strips 14, the average value is generated line-by-line in each case. This produces a one-dimensional stream of data from a two-dimensional image strip 14. This stream of data is searched by the known methods of edge detection for a sufficiently strong and steep edge. To do this, the approach again runs through the image strips 14 starting from the outer image regions and finds the first image strip 14 with a sufficiently strong and steep edge. The assumption is then made that the transition between the reflector roller 5 and document 4 is located here. This method is very strong in response to interference factors that affect all image lines uniformly, such as those that can be caused by contamination on the nonrotating reflector rollers or on the optics (in particular, glass plate) of the scanner. What is particularly important to consider here is the "steepness" of the edge since edges can also be created, but with reduced "steepness," in areas adjacent to the document 4 by changes in the size of the air gap between the reflector roller 5 and the glass plate 3 when the document 4 is fed in between the glass plate 3 and the reflector roller 5.

In addition, detection is also effected of a "skewed" leading edge in the area adjacent to the area in which the transition was recognized between the reflector roller 5 and document 4 by the above-described method. The above-referenced method is used for this purpose—however, the image strips 14 are not cut orthogonally relative to the longitudinal direction, but instead rotated incrementally up to 90°, preferably, 45°. This approach enables even those documents to be reliably detected that have folded corners, also called dog-eared sections, or torn areas in the corner regions.

Fine Recognition

Fine recognition of the document edges 10 and 11 is effected by the known methods of edge detection, such as for example Sobel or Laplace operators. Since the search area has already been considerably reduced by the coarse recognition operation and most of the interference factors 17 or 18 have been eliminated by preprocessing, the hit rate is very high. The first edge is determined with a threshold value so as to prevent edges in the document 4 from being erroneously recognized as a transition between the reflector roller 5 and the document 4. If no edge is found with the threshold value, then the strongest edge is used. This then also ensures effective recognition for originals with an extremely weak edge between the reflector roller 5 and the document 4, such as for example thin transparencies, due to the fact that in this case the first edge is detected in the document 4 for example framing in technical documents, and the approach in any case (reliably) finds a value within the area limited by the coarse recognition.

The advantages of the novel method over known methods are that it provides reliable recognition even when only a minimal shadow 16 is cast at transverse transitions between reflector, such as the reflector roller 5 and the document 4, and when there are slight brightness differences between the document 4 and the reflector roller 5, as well as the interference factors 17 and/or 18 caused by contaminated reflector rollers 5 and optics, such as for example glass plate 3. The approach also reliably enables dog-eared sections and/or corners to be detected.

It has been found that the method also produces good is results with other preprocessing approaches for image data, even when preprocessing of the image data is omitted.

The invention claimed is:

1. A method of recognizing the width and position of documents in a large-format scanning system having at least one image-detecting element that records image information from an original passing in a direction past the element, a transparent plate in front of the element, and at least one roller opposite the image-detecting element, the method comprising the steps of:

S1) before the document reaches the roller, preprocessing the recorded image information in order to reduce interference factors due to contamination of the transparent plate and roller;

S2) coarsely recognizing longitudinal or transverse transition regions between the roller and the document by the substeps of:

S2a) dividing a scanning image transversely into uniform image strips,

S2b) determining statistical parameters for each image strip,

S2c) examining the scanning image in the image strips with fixed threshold values for deviations such that, if a value of one the statistical parameters of an image strip exceeds the threshold value, this region is recognized as being a transverse transition region between the roller and the document, and S2d) examining the image strips to determine the longitudinal transition region by line-by-line generation of an average value and determining sufficiently strong and steep edges, the image strips being rotated incrementally from the transverse of the document to an angle of at most 90°; and S3) finely recognizing longitudinal or transverse document edges within the transition regions detected in step S2 by coarse recognition.

2. The method defined in claim 1, wherein the angle is 45°.

3. The method defined in claim 1, wherein the preprocessing in step S1 comprises the following substeps:

S1a) generating average values of the pixels for each image column in the leading end of the longitudinal transition region, before the document moves onto the roller, in order to generate a line average value; and determining an average value of the entire leading end of the longitudinal transition region before the document moves onto the roller, S1b) determining a weighting factor for each image column based on a magnitude of the deviations of the average values of pixels for the respective beginning of the image column from the average values of the pixels for the respective end of the image column and the standard deviation of the respective image column;

S1c) calculating a new image from the recorded image information utilizing the weighting factor and the average value of the longitudinal transition region.

4. The method defined in claim 1, wherein the statistical parameters for each image strip in steps S2b and S2c are the average value or the standard deviation.

5. The method defined in claim 1, wherein the fine recognition of the document edges in step S3 comprises the following steps:

S3a) detecting longitudinal or transverse document edges within the transition and regions using an imaging method of detecting edges;

S3b) determining a first edge by a threshold comparison.

6. The method defined in claim 5, wherein the fine recognition of the document edges in step S3 also comprises the following additional substep:

S3c) using the strongest edge whenever no edge is found by the threshold comparison of substep S3b.

7. The method defined in claim 1, wherein the transparent plate in front of the image-detecting elements for recording the image information is a glass plate and the roller opposite the image-detecting elements is a pressure roller.

* * * * *